United States Patent Office 3,725,115
Patented Apr. 3, 1973

3,725,115
PRESSURE-SENSITIVE ADHESIVE ARTICLES AND METHOD OF MAKING SAME
Roger M. Christenson and Carl C. Anderson, Gibsonia, Pa., assignors to PPG Industries, Inc., Pittsburgh, Pa.
No Drawing. Filed June 18, 1970, Ser. No. 47,557
Int. Cl. B44d 1/50
U.S. Cl. 117—93.31
13 Claims

ABSTRACT OF THE DISCLOSURE

A pressure-sensitive adhesive having excellent properties is formed by heating a solid radiation-sensitive hot-melt composition of tacky low molecular weight polymers which are capable of forming pressure-sensitive adhesives to a temperature sufficiently above its melting point and applying the hot-melt composition to a backing and subjecting the hot-melt composition to ionizing irradiation. The resulting material is a strong pressure-sensitive adhesive.

This invention relates to a method of preparing pressure-sensitive adhesives and more particularly to a method of preparing from a hot-melt composition pressure-sensitive adhesives.

For many years, the art of pressure-sensitive adhesives has been limited to water-based and solvent-based adhesives. These adhesives give excellent adhesive properties such as bonding strength, tack, and cohesive strength. However, these adhesives have several disadvantages. The water-based adhesives tend to have poor water resistance, are subject to freezing, are slow drying in ovens, and are corrosive to some metals, while the solvent-based adhesives present a fire and explosion hazard and necessitate the use of special explosion proof and ventilating aquipment. Moreover, these solvent adhesives have to be prepared in solutions of about 30 percent solids or less. This is a great economic drawback as it requires expensive solvents, increased transportation costs, and long drying and baking times.

To alleviate some of the above problems, hot-melt adhesives came into use. The hot-melt adhesives are solid materials which are heated until fluid, applied to a substrate and then cooled to an adhesive form. They are 100 percent solids and, hence, require no solvents.

One hundred percent solids adhesives have many advantages. For example, they are not only lower in initial cost because they are solventless but also have lower actual freight costs than solvent- or water-based adhesives because every pound of material shipped is film-forming and useful in the final bond. Package costs of hot-melts are less than for solvent- or water-based adhesive per pound of useful product. With hot-melts and other 100 percent solids adhesives, there is no danger of freezing and the hazards of using flammable and toxic solvents are eliminated. No drying equipment is necessary to remove water or solvent. The stability of shelf aging is not usually a problem with hot-melt adhesives as may be the case with water-based or solvent-based compounds.

The major problem involving use of hot-melt adhesives is that high molecular weight materials are needed to give pressure-sensitive adhesives having good bond strength and toughness. Hot-melt compositions are necessarily low temperature melting and accordingly of low molecular weight to provide fluidity at temperatures where thermal and color stability are maintained and so as not to affect temperature sensitive backings. Therefore, a compromise is usually required between molecular weight and temperature to obtain workable stability, application and bond strength. Thus, the strength of the hot-melt adhesive is usually much lower than that of the solvent-based adhesives containing high molecular weight polymers as the solvent-based adhesives may be formed by using higher molecular weight polymers.

It has now been found that pressure-sensitive adhesives formed from hot-melt compositions having improved creep resistance, strength, and solvent resistance may be formed by subjecting the hot-melt compositions to ionizing irradiation. The improved properties result from the increased molecular weight of the polymers due to the radiation treatment.

The novel method of this invention comprises heating a solid radiation-sensitive composition comprising tacky low molecular weight polymers having a Williams' plasticity number of up to about 1.5 and which is capable of forming a pressure-sensitive adhesive, to a temperature sufficiently above the melting point to maintain it as a hot-melt and applying said hot-melt composition to a backing, and subjecting said composition to ionizing irradiation.

The standard Williams' plasticity number is defined as the resulting height in millimeters of a 2-gram sample of the solid polymer in a form approximating a sphere after a 5,000-gram flat weight has been applied for 14 minutes to the sample held at 100° F.

By "pressure-sensitive" is meant an adhesive which is characterized by a property which permits the adhesive coated backing to adhere on mere contact with adhesive-receptive surfaces to which applied. Once the adhesive coated material contacts the surfaces, it can no longer be moved about without being first stripped from the surface.

The preferred polymeric hot-melt compositions are those having a melt viscosity between about 500 and 100,000 centipoises at 350° F. Examples of hot-melt compositions usable in this invention are acrylic polymers, such as those formed by polymerizing acrylic monomers such as alkyl acrylates and methacrylates, wherein the alkyl radical of the acrylate preferably contains from about 4 carbon atoms to about 12 carbon atoms and the alkyl methacrylates contain from about 6 to about 12 carbon atoms such as butyl acrylate, 2-ethylhexylacrylate, 2-ethylhexyl methacrylate, octyl acrylate, and methacrylate, and the like, copolymers of acrylics such as copolymers of butyl acrylate-vinyl acetate or 2-ethylhexyl acrylate, vinyl acetate, and acrylic acid.

Other radiation-sensitive monomers may be added to the hot-melt composition to give desired properties to the pressure-sensitive adhesives. Examples of such materials are polypropylene glycol dimethacrylate, trimethylol propane trimethacrylate, and low molecular weight carboxyl terminated polybutadiene. Of course, when these materials are present, it is not necessary to heat the adhesive to as high a temperature as would be necessary if they were not present, as the viscosity of the hot-melt comopsition is lowered by them. Generally, it is preferred that the hot-melt composition comprise no more than about 20 percent by weight of these added monomers, and the formulation should contain a sufficient amount of thermal stabilizer such as tetrakis [methylene 3-(3'5'-di-t-butyl-4'-hydroxyphenyl) propionate] methane.

The hot-melt composition may also comprise various other additives such as plasticizers, tackifiers, fillers, and the like.

The composition may be applied to the backing by any conventional means such as roller coating, dip coating, extrusion, and spray coating. The composition is heated to a temperature above its melting point to keep it in a liquid or fluid state for a period of time sufficient to apply the composition to the backing. After the composition is applied to the backing, it may cool and solidify. The coated backing material is then subjected to ionizing irradiation to form a pressure-sensitive adhesive having improved properties.

The backing on to which the hot-melt composition is applied may be selected from a variety of materials. As it is desired to bond a specific backing to another material, it is advantageous to apply the hot-melt in its liquid or flowable form on to such backing and then subject the coated backing to ionizing irradiation. In this way, a nearly instantaneous bonding between the backing and composition occurs. This creates a very strong bond between the coating and backing. The adhesive-coated backing may then be bonded to a desired material by merely placing the material to be bonded to the backing on the coating and applying pressure.

Substrates may also be laminated on to the adhesive-coated backing in situ. That is, the hot-melt coating may be applied to the backing and the substrate may be placed over the adhesive. The entire laminate may then be subjected to ionizing irradiation, thus bonding the backing to the substrate.

Alternatively, a pressure-sensitive adhesive film may be formed by applying the hot-melt to a release material such as a silicone-coated paper and then subjecting the hot-melt to ionizing irradiation. The hot melt may then be stripped from the release material and used as a film.

The hot-melt composition need only be heated to a temperature above the melting point of the composition to render said composition fluid (liquid) and flowable and to allow said composition to remain flowable for the time necessary to apply the composition to the substrate. Generally, the composition is heated to from about 250° F. to about 400° F.

After the composition is applied, it may be allowed to cool until the composition is no longer flowable. This temperature varies generally from about 100° F. to 250° F. but the composition may be allowed to cool to room temperature before the radiation treatment.

The particular backing used is not critical. If the pressure-sensitive adhesive is to be used as a film adhesive, the backing should be a release material such as silicone-coated paper, polyethylene, or other common release materials. Other backing such as paper, cloth, plastic, wood, and metals, may be used. It is desirable, of course, to use a backing which is not severely degraded by the irradiation treatment.

If the backing to which the adhesive is desired to be applied is degradable by the irradiation treatment or is excessively heat-sensitive, the adhesive may be coated on to a release paper and subjected to irradiation and thereafter transferred from the release paper to the desired backing material.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type traveling wave accelerator, model Mark I, operating at 3 to 10 million electron volts, such as supplied by High Voltage Engineering Corporation, Burlington, Mass., or other types of accelerators as described in U.S. Pat. 2,763,609 and in British Pat. No. 762,953 are satisfactory for the practice of this invention.

The hot-melt compositions described herein will cure acceptably using any total dosage between about 0.2 megarad and about 100 megarads. A "rad" is defined as that amount of radiation required to supply 100 ergs per gram of material being treated and a "megarad" is $10^6$ rads. The total dosage is the total amount of irradiation received by the hot-melt composition. The preferred dosage received is from about 0.5 megarad to about 12 megarads.

It has been found that there exists a relationsihp between the Williams' plasticity number of the polymers of the hot-melt composition to be applied and the total dosage of irradiation which will produce an effective pressure-sensitive adhesive. Where compositions having a higher Williams' plasticity number are used, generally, the total dosage of irradiations should be lower and where compositions having lower Williams-plasticity numbers are used, higher doses of irradiation may be used. Thus, when compositions having a Williams' plasticity of about 0.6 are used, it may be preferred to use a maximum of about 10 megarads while when compositions having a Williams' plasticity of 1.5 are used, it is preferred to use a maximum of about 5 megarads. Combinations of higher Williams' plasticity numbers and higher dosage of irradiation yield pressure-sensitive adhesives with less tack but superior heat and solvent resistance and combinations of lower Williams' plasticity numbers with low dosages yield pressure-sensitive adhesive having less strength but superior tack. Thus, a balance may be made to suit the particular requirements of our adhesive.

The irradiated hot-metal adhesive compositions of this invention are particularly useful for the preparation of laminates and for bonding wood, paper, plastics, textiles, and other materials for which strong pressure-sensitive adhesives are useful.

The following examples set forth specific embodiments of the instant invention, however, the invention is not to be construed as being limited to these embodiments for there are, of course, numerous possible variations and modifications. All parts and percentages in the examples as well as throughout the specification are by weight unless otherwise indicated.

EXAMPLE 1

A low molecular weight interpolymer having a Williams' plasticity of 1.02 and comprising 55 percent by weight of 2-ethylhexyl acrylate, 43 percent by weight of vinyl acetate and 2 percent by weight of dimethylaminoethyl methacrylate was heated to 350° F. and applied to a release paper and allowed to cool to room temperatures.

The above coated release paper was then cured by subjecting it to an electron beam source. The coating was subjected to electron beam impingement at an accelerating voltage of 450 kv. and a tube current of 14 milliamps. The total dosage received was 8 megarads.

The resulting adhesive was tested by measuring its peel strength, shear strength, and plasticity both before and after the radiation treatment.

The peel strength was determined by transferring a 1-mil film of the adhesive composition from the release paper to a plasticized polyvinyl chloride backing 4 mils thick. A 1-inch strip of the adhesive-coated backing was bonded to a clean dry stainless steel panel using 4 strokes with a 4½ pound roller at about 12 inches per minute. The bonded assembly was allowed to remain at room temperature for 20 minutes and then the load necessary to peel the strip from the panel at a rate of 12 inches per minute and at a 180° angle was determined. The results are measured in grams per inch of width.

The shear strength is measured by transferring the adhesive on to a 2-mil thick polyethylene terephthalate (Mylar) sheet at a dry film weight of 0.006-0.008 gram per square inch. The coated Mylar sample is then applied to a steel panel with a ½ inch by ½ inch overlap joint. A two-pound weight was suspended from the Mylar with the steel panel maintained vertically and the time until separation occurs is measured. The test is carried out at 73° F. and 50 percent relative humidity. This test is a measure of the cohesive strength and the ability to maintain cohesive strength over a period of time and, of course, the best results are adhesives showing the longest time.

The following are the results obtained:

|  | Adhesive before irradiation | Adhesive after irradiation |
| --- | --- | --- |
| Williams plasticity number | 1.02 | 3.57 |
| Peel strength (grams per inch) | (¹) | 635 |
| Shear strength, minutes | 8 | 420 |

¹ Too soft to get a result.

EXAMPLE 2

A low molecular weight polymer comprising 55 percent by weight of 2-ethylhexyl acrylate, 40 percent by weight of vinyl acetate, 2 percent by weight of acrylic acid, and 3 percent by weight of diacetone acrylamide was prepared as follows:

A container was charged with 200 grams of 2-ethylhexyl acrylate, 700 grams of vinyl acetate, 5 grams of acrylic acid, 1.5 grams of diacetone acrylamide, 1.5 grams of azobis isobutyronitrile, 100 grams of ethyl acetate, and 9.59 grams of isopropyl alcohol and heated to 75° C. To this solution was then added incrementally, over a period of 2 hours, a mixture of 900 grams of 2-ethylhexyl acrylate, 100 grams of vinyl acetate, 35 grams of acrylic acid, 45 grams of diacetone acrylamide and 3 grams of azobis isobutyronitrile. The mixture was maintained at 77° C. and the reaction was continued for an additional 4 hours. To the polymer was then added 10 grams of an antioxidant and thermal stabilizer (Irganox 1010). The interpolymer had a 56.93 percent total solids content, a Gardner-Holdt viscosity of Z-2 and a Williams' plasticity number of 1.03. The solvent was evaporated and the composition heated to 350° F. The Brookfield viscosity of the composition was 10,800 centipoises and the hot-melt was applied to release paper and allowed to cool. The coating weight was 0.012 gram per square inch. The coating was then subjected to electron beam impingement of a total dose of 8 megarads in a nitrogen atmosphere and the Williams' plasticity number was determined to be 2.29.

The coated backing was tested for adhesive properties by determination of its plasticity number, peel strength, and shear strength, as in Example 1, both before and after the radiation treatment. The results are shown below:

|  | Adhesive before irradiation | Adhesive after irradiation |
| --- | --- | --- |
| Williams' plasticity number | 1.03 | 2.29 |
| Peel strength (grams per inch) | (¹) | 1,450 |
| Shear strength, minutes | 5 | 450 |

¹ Too soft to measure.

EXAMPLE 3

A low molecular weight polymer comprising 55 percent by weight of 2-ethylhexyl acrylate, 40 percent by weight of vinyl acetate, 2 percent by weight of acrylic acid and 3 percent of N-vinyl pyrrolidinone was heated to 350° F. The Brookfield viscosity of the composition was 10,000 centipoises and the hot-melt was applied to release paper and allowed to cool. The dry coating thickness was 1.5 mils. The hot-melt composition had a Williams' plasticity number of 1.13. The coating was then subjected to electron beam impingement to total doses of 6 to 8 megarads in a nitrogen atmosphere and the Williams' plasticity number of the coating after 8 megarads was determined to be 3.12.

The coated backing was tested for adhesive properties and the following results were obtained:

|  | Adhesive before irradiation | Adhesive after— Irradiation of 6 megarads | Adhesive after— Irradiation of 8 megarads |
| --- | --- | --- | --- |
| Williams' plasticity number | 1.13 |  | 3.12 |
| Peel strength (grams per inch) | (¹) | 1,000 | 1,030 |
| Shear strength, min. | 10 | 450 | 630 |

¹ Not run, too soft.

EXAMPLE 4

A low molecular weight interpolymer comprising 55 parts of 2-ethylhexyl acrylate, 39 parts of vinyl acetate, 3 parts of acrylic acid and 3 parts of diacetone acrylamide was heated to 350° F. The Brookfield viscosity of the composition was 8,000 centipoises and the hot-melt was applied to release paper and allowed to cool. The Williams' plasticity number of the composition was 0.62 and the shear of the coated substrate was only ½ minute.

The coated release paper was then subjected to electron beam impingement to a total dosage of 10 megarads in a nitrogen atmosphere and the resulting adhesive was once again tested for strength. The Williams' plasticity number rose to 1.85 and the shear strength after irradiation was 30 minutes.

EXAMPLE 5

Three hot-melt compositions comprising (a) 55 percent by weight of 2-ethylhexyl acrylate and 45 percent by weight of vinyl acetate, (b) 55 percent by weight of 2-ethylhexyl acrylate, 43 percent by weight of vinyl acetate, and 2 percent by weight of acrylic acid, and (c) 55 percent by weight of 2-ethylhexyl acrylate, 40 percent by weight of vinyl acetate, 2 percent by weight of acrylic acid, and 3 percent by weight of diacetone acrylamide, were heated to 350° F. where they were found to have Brookfield viscosities of 13,600 centipoises, 8,400 centipoises, and 10,800 centipoises, respectively.

Release papers were coated with the hot-melt compositions at 350° F. and the resulting coating weights were about 0.025 gram per square inch.

The coatings were subjected to electron beam impingement at total dosages of 6 and 8 megarads and adhered to Mylar film. The adhesive-coated Mylar was then bonded to stainless steel panels and after aging for 20 minutes, the peel strength was determined and the following results were obtained:

TABLE 1

| Sample | Dose (megarad) | Peel strength (gram per inch) |
|---|---|---|
| A | 6 | 676 |
|  | 8 | 674 |
| B | 6 | 848 |
|  | 8 | 840 |
| C | 6 | 1,090 |
|  | 8 | 893 |

EXAMPLE 6

Vinyl sheets were coated with the compositions of Example 5 by applying the compositions to release paper at their melting point and allowing them to cool, irradiated at various dosages and transferring to vinyl sheets. The coating weights were about 0.01 gram per square inch.

The peel strength and shear strength of the coatings were tested and the results are presented in Table 2.

TABLE 2

| Example | Dose (megarad) | Peel strength | Shear strength (hours) |
|---|---|---|---|
| A | 6 | --------- | 1.5 |
|  | 8 | --------- | 2 |
| B | 6 | 1,167 | 2.5 |
|  | 8 | --------- | 5.5 |
| C | 6 | 651 | 1.5 |
|  | 8 | 1,413 | 7.5 |

The initial shear strength of the materials before irradiation were only 5 minutes, 10 minutes, and 5 minutes, respectively. The effect of 8 megarads of radiation treatment increased the shear strength of Example C from 5 minutes to 7½ hours.

According to the provisions of the patent statutes, there is described above the invention and what are now considered to be its best embodiments. However, within the scope of the appended claims, it is to be understood that the invention can be practiced otherwise than is specifically described.

What is claimed is:

1. The method of forming pressure-sensitive adhesive articles having good cohesive strength which comprises heating a solventless radiation-sensitive composition comprising one or more tacky low molecular weight polymers to a temperature sufficiently above the melting point to maintain it as a hot-melt and applying said hot-melt on a backing and subjecting said composition to ionizing irradiation, wherein before irradiation said polymers have a Williams' plasticity number of up to about 1.5 and have greatly increased cohesive strength after being subjected to ionizing irradiation.

2. The method of claim 1 wherein the hot-melt composition contains an acrylic polymer.

3. The method of claim 1 wherein the composition is subjected to a total dose of about 0.5 to about 12 megarads.

4. The method of claim 1 wherein the backing is a release material.

5. The method of claim 1 wherein the backing is selected from the group of vinyl, cellulose-based materials, metal foil, polyesters and fabric.

6. The method of claim 4 wherein the adhesive coating on the release material is laminated to another backing.

7. The method of claim 6 wherein the adhesive coating is stripped from the release material.

8. The method of bonding materials which comprises heating a solid radiation-sensitive composition comprising one or more tacky low molecular weight polymers, having a Williams' plasticity number of up to about 1.5 and which is capable of forming a pressure-sensitive adhesive after irradiation, to a temperature sufficiently above the melting point to maintain it as a hot-melt and applying said hot-melt on a backing and subjecting said composition to ionizing irradiation and pressing a second substrate to the adhesive thereby forming a laminated composite of backing, adhesive, and substrate.

9. The method of bonding materials which comprises heating a solid radiation-sensitive composition comprising one or more tacky low molecular weight polymers, having a Williams' plasticity number of up to about 1.5 and which is capable of forming a pressure-sensitive adhesive after irradiation, to a temperature sufficiently above the melting point to maintain it as a hot-melt and applying said hot-melt on a backing and pressing a second substrate to the hot-melt composition to form a composite of backing, adhesive, and substrate and subjecting the composition to ionizing irradiation.

10. The pressure-sensitive adhesive article formed by the method of claim 1.

11. The composite formed by the method of claim 6.

12. The composite formed by the method of claim 8.

13. The composite formed by the method of claim 9.

References Cited

UNITED STATES PATENTS

| 2,956,904 | 10/1960 | Hendricks | 117—93.31 |
| 3,398,014 | 8/1968 | Turner | 117—122 PA |
| 3,451,537 | 6/1969 | Freeman et al. | 117—122 PA |
| 3,462,284 | 8/1969 | Vertnik | 117—122 PA |

ALFRED L. LEAVITT, Primary Examiner

J. H. NEWSOME, Assistant Examiner

U.S. Cl. X.R.

117—122 P, 122 PA; 156—230, 247, 272, 327; 161—406